United States Patent [19]

Durivage et al.

[11] Patent Number: 4,706,155
[45] Date of Patent: Nov. 10, 1987

[54] RESTRAINT SIGNAL INTERFACE CIRCUIT

[75] Inventors: Leon W. Durivage, Marion; Ronald L. Farrington, Cedar Rapids, both of Iowa

[73] Assignee: Square D Company, Palatine, Ill.

[21] Appl. No.: 708,927

[22] Filed: Mar. 6, 1985

[51] Int. Cl.$^4$ ............................................. H02H 3/04
[52] U.S. Cl. ........................................ 361/64; 361/66; 361/68
[58] Field of Search ...................... 361/62, 64, 66, 68; 364/483, 492; 340/661, 662, 663, 664, 825.16

[56] References Cited

U.S. PATENT DOCUMENTS

| | | | |
|---|---|---|---|
| 4,112,476 | 9/1978 | Benninger | 361/68 X |
| 4,322,768 | 3/1982 | Maeda et al. | 361/68 X |
| 4,468,714 | 8/1984 | Russell | 361/62 |
| 4,470,093 | 9/1984 | Yamaura | 361/68 |
| 4,551,718 | 11/1985 | Cookson et al. | 340/825.16 |

*Primary Examiner*—A. D. Pellinen
*Assistant Examiner*—Derek S. Jennings
*Attorney, Agent, or Firm*—Larry I. Golden; Richard T. Guttman

[57] ABSTRACT

An electrical distribution system having a plurality of dissimilar protective circuit breakers spaced upstream and downstream along the stream of the system includes a restraint signal interface circuit producing upstream restraint signals to the upstream breakers in response to received downstream restraint signals indicating the state of the downstream circuit breakers. The interface circuit pairs the downstream and upstream restraint signals to have the same electrical parameters and information, ground fault and short-time, content, while different pairs have different parameters and information content. A selection or logic circuit internal of the interface circuit distributes an active information state to all upstream restraint signals carrrying the same information as any one downstream restraint signal in an active information state.

13 Claims, 3 Drawing Figures

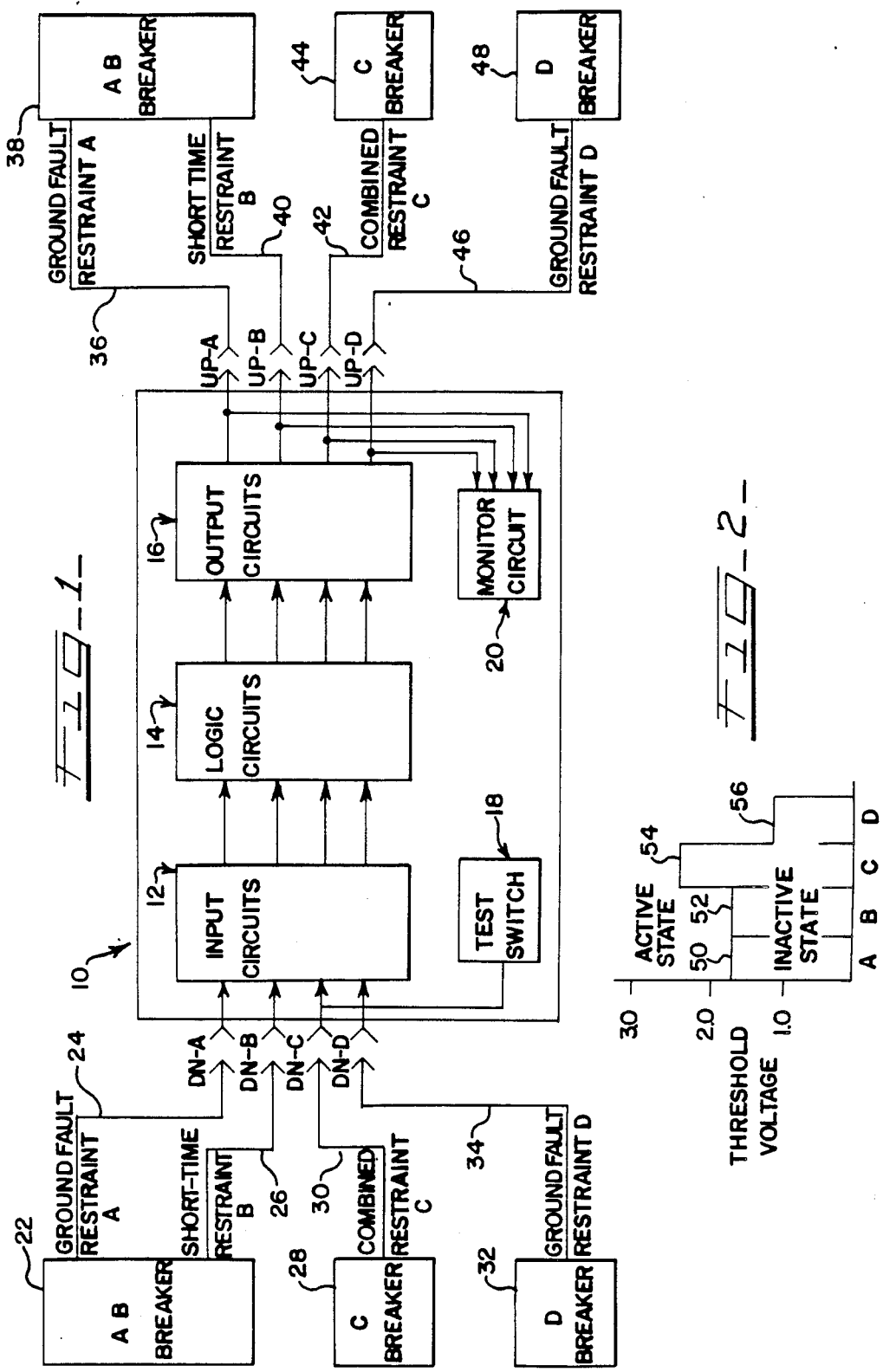

RESTRAINT SIGNAL INTERFACE CIRCUIT

DESCRIPTION

1. Technical Field of the Invention

This invention relates generally to alternating current electrical distribution systems having a plurality of protective relay equipment or circuit breakers spaced along the stream of the distribution system from a source of supply to a plurality of separate loads. Particularly, this invention relates to producing control signals, in the form of upstream restraint signals, to upstream circuit breakers dependent on the states of downstream circuit breakers, where the downstream restraint signals indicating the states of the downstream breakers are incompatible with one another electrically and informationally and the control signals to the upstream breakers are similarly incompatible with one another. The invention also particularly relates to producing control signals for other protective relay equipment such as a ground fault sensing system. The invention will be described, however, in connection with circuit breakers.

2. Background Prior Art

In electrical distribution systems it is advantageous to open or trip the circuit breaker next upstream of the location of a fault condition rather than to open or trip a circuit breaker further upstream of the fault and other electrical users. A faulty motor in a factory can thus be removed from the electrical distribution system without interrupting electrical service to the entire factory or nearby motors.

Coordination of the tripping of upstream and downstream circuit breakers to isolate only the fault condition uses control in the form of restraint signals. A downstream breaker protecting a motor can issue an active state restraint signal indicating that it has determined a fault condition exists in the motor and that it will open to remove the motor from the system. The upstream breakers also recognize the fault but when they receive the downstream restraint signal they delay their operation a time sufficient for operation of the downstream breaker. Without receipt of the downstream restraint signal, the upstream breakers can operate immediately when they sense a fault condition, possibly interrupting more service than is necessary. Failure of the downstream breaker to open or otherwise clear the fault condition from the system after issuance of the restraint signal will enable intermediate and main breakers to open in an ordered hierarchical sequence determined by the restraint signal system design. Compatible restraint signals can be connected together to attain system requirements; not all restraint signals, however, are compatible.

Technological advances in electronics have resulted in production of molded case circuit breakers with electronic trip-units having dissimilar restraint signals due to differing internal circuitry. This makes it impossible to coordinate the dissimilar circuit breakers using direct wiring of the restraint lines. For example, a first type of presently available circuit breakers used in the described system each produce two restraint signals. Both restraint signals occur at the same first set of electrical parameters of voltage and current but one signal carries only ground fault information and the other carries only short-time information.

A second type of circuit breakers each produce one restraint signal at a second set of electrical parameters and carrying combined ground fault and short-time information. A third type of breakers each produce one restraint signal at a third set of electrical parameters and carrying only ground fault information. Each type of circuit breakers, when used in an upstream location, must receive the same kind of signal, concerning electrical parameters and information carried, that it produces.

It is known to use an interface module to produce all of a plurality of upstream restraint signals in response to any one received restraint signal, see U.S. Pat. No. 4,468,714 to Russell. The disclosure of that patent, however, is undesirable for a distribution system using the three types of breakers just described. A received downstream restraint signal indicating a ground fault state in a downstream breaker should affect only all those upstream circuit breakers concerned with a ground fault restraint condition. Not all of the possible upstream circuit breakers concerned with ground fault and short-time restraint conditions should be affected. Further, the referenced patent is unconcerned with electrical parameter incompatibility of the plural received or produced restraint signals.

It would be highly advantageous to be able to interconnect the incompatible restraint signals of these presently available circuit breakers to effect proper protection of electrical distribution systems.

SUMMARY OF THE INVENTION

In accordance with the invention, there is provided a restraint signal interface circuit that produces control signals in the form of upstream restraint signals at certain electrical parameters and of certain information content in response to received downstream restraint signals that indicate the state or condition of downstream circuit breakers and that are at certain electrical parameters and of certain information content. The circuit of the invention interfaces otherwise incompatible restraint signals of presently available circuit breakers to one another to meet the design requirements of protecting electrical distribution systems having a plurality of protective circuit breakers spaced upstream and downstream along the stream of the distribution system from a source of supply to a plurality of loads.

The interface circuit includes a plurality of input circuits, intermediate logic circuits and output circuits. These circuits are arranged so that for each received downstream restraint signal there is one corresponding input circuit, intermediate logic circuit and output circuit sequentially connected together to produce an upstream restraint signal paired with that downstream restraint signal. The produced upstream restraint signal has the same electrical parameters and indicates the same information as its paired downstream restraint signal.

Each input circuit modulates the received downstream restraint signal to a set of common electrical parameters indicating the active and inactive information state of that received signal. Each logic circuit has one input connected to its corresponding input circuit and has an additional input or inputs connected to other selected input circuits that indicate the same type of information as the corresponding input circuit. The output of each logic circuit then indicates the receipt of an active information state at its corresponding input circuit and the receipt of an active state at any other selected input circuit carrying the same type of information. Each output circuit receives the active and inactive state information from its corresponding logic circuit and reproduces or combines those states with the proper electrical parameters for that produced upstream restraint signal.

The interface circuit thus is arranged so that an active state in a received downstream restraint signal effects an active state in the produced upstream restraint signal with which it is paired and additionally produces an active state in the produced upstream restraint signals carrying that same type of information. The active information content of any received downstream restraint signal is reproduced in all upstream restraint signals carrying the like information.

With four input and output terminals, one downstream restraint signal carrying ground fault information, thus, can activate three upstream restraint signals, of four possible, that each indicate ground fault information at different electrical parameters. One downstream restraint signal carrying short-time information can activate two upstream restraint signals that each carry short-time restraint information at different electrical parameters. One downstream restraint signal that carries combined ground fault and short-time restraint information can be used to activate all four of the upstream restraint signals to indicate ground fault and short-time restraint information at different electrical parameters.

Other advantages and features of the invention will become apparent upon making reference to the specification, claims, and drawings to follow.

BRIEF DESCRIPTION OF DRAWINGS

FIG. 1 is a schematic block diagram of a restraint signal interface circuit of the invention connected between downstream and upstream circuit breakers;

FIG. 2 is a graph illustrating the relative threshold voltages between the active and inactive states of the restraint signals of the downstream and upstream circuit breakers.

DETAILED DESCRIPTION OF THE INVENTION

Figure 3:
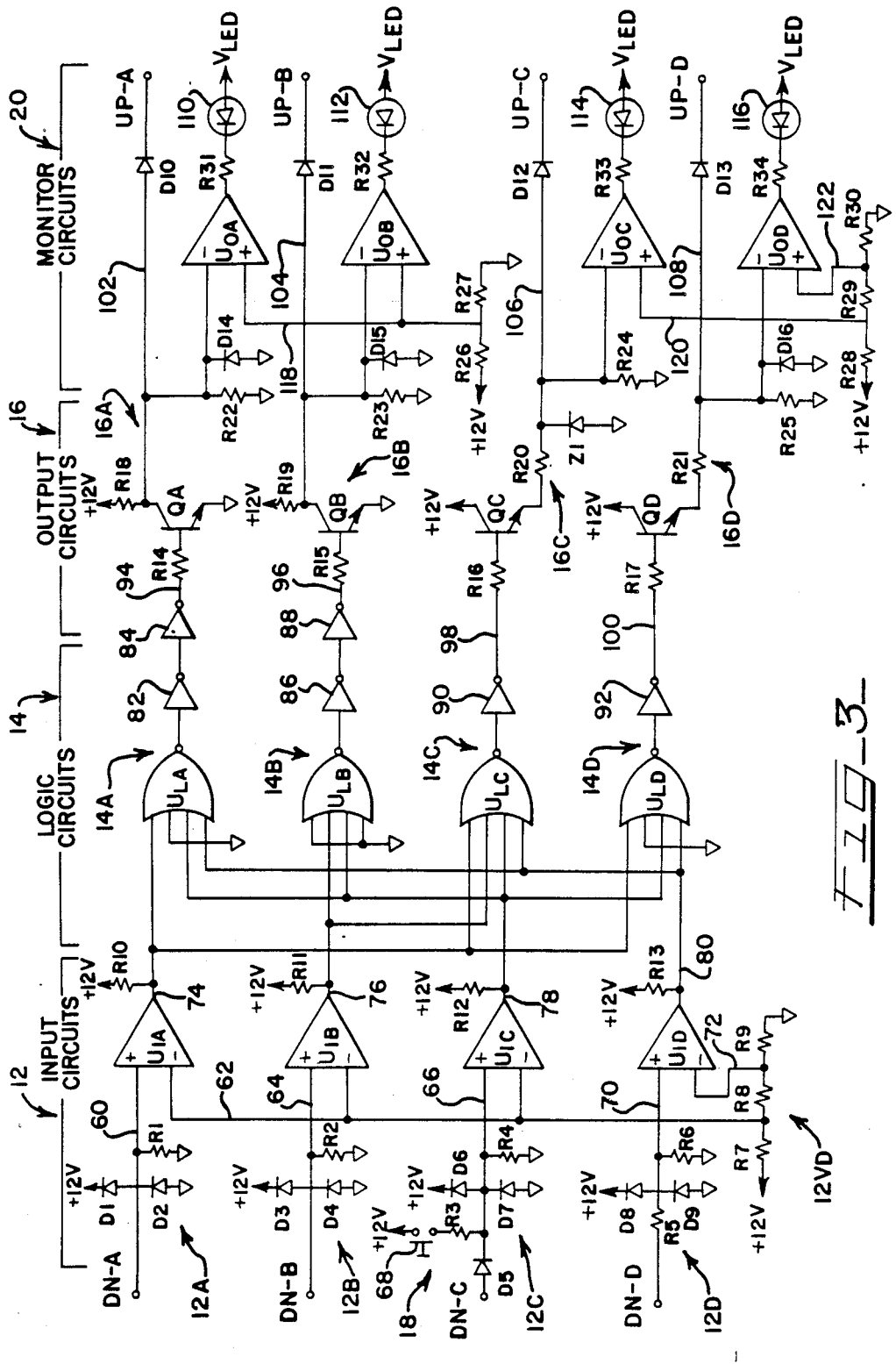
FIG. 3 is a circuit diagram of the restraint signal interface circuit of the invention.

The invention will best be understood by considering that four downstream restraint signals are to be interfaced to four upstream restraint signals. Each downstream restraint signal is paired with an upstream restraint signal and each pair of restraint signals have the same electrical parameters of voltage and current and carry the same type of ground fault and short-time information. Upstream and downstream restraint signals A, for example, are at one set of electrical parameters and carry only ground fault information. Downstream and upstream restraint signals B are at the same first set of electrical parameters but carry only short-time restraint information. Downstream and upstream restraint signals C are at a second set of electrical parameters and carry both ground fault and short-time restraint information. Downstream and upstream restraint signals D are at a third set of electrical parameters and carry only ground fault information.

The interface circuit of the invention accommodates the electrical parameters of the four pairs of restraint signals while distributing to all related or selected upstream signals the active information content of any one received downstream restraint signal. The present invention thus provides an interface circuit that can be used to connect together otherwise incompatible restraint signals for protecting an electrical distribution system utilizing a plurality of protective circuit breakers.

In FIG. 1, the restraint signal interface circuit of the invention, indicated generally by reference character 10, comprises four input terminals DN-A through DN-D, four output terminals UP-A through UP-D, sequentially connected input circuits 12, logic circuits 14 and output circuits 16, a test switch circuit 18 and a monitor circuit 20.

Downstream of interface circuit 10, AB circuit breaker 22 produces two downstream restraint signals A and B respectively on leads 24 and 26. Downstream restraint signal A carries ground fault information at a first set of electrical parameters and is connected to input DN-A. Downstream restraint signal B carries or indicates short-time information at the first set of electrical parameters and is connected to input DN-B.

C circuit breaker 28 produces downstream restraint signal C on lead 30 indicating or carrying combined ground fault and short-time information at a second set of electrical parameters and is connected to input DN-C. D breaker 32 produces a downstream restraint signal D on lead 34 carrying or indicating ground fault information at a third set of electrical parameters and is connected to input DN-D.

Interface circuit 10 produces at output terminal UP-A an upstream restraint signal A at the first set of electrical parameters and indicating only ground fault information on lead 36 to AB breaker 38. Interface circuit 10 produces at terminal UP-B an upstream restraint signal B at the first set of electrical parameters and carrying only short-time information on lead 40 also to AB breaker 38. Interface circuit 10 produces at output terminal UP-C an upstream restraint signal C at the second set of electrical parameters and carrying combined ground fault and short-time information on lead 42 to C breaker 44. Interface circuit 10 produces at output terminal UP-D an upstream restraint signal D at the third set of electrical parameters and carrying only ground fault information on lead 46 to D breaker 48.

Downstream restraint signal A on lead 24 and upstream restraint signal A on lead 36 are thus paired with each other and have the same electrical parameters and carry the same ground fault information. Downstream restraint signal B on lead 26 and upstream restraint signal B on lead 40 are similarly paired as are downstream and upstream restraint signal C and downstream and upstream restraint signals D.

In FIG. 2, each of the pairs of downstream and upstream restraint signals A, B, C, and D have threshold levels above which the signals are considered to be in an active state and below which the signals are considered to be in an inactive state, the states indicating the information content of the signals. The threshold levels 50 and 52 for signals A and B respectively are approximately 1.8 volts. The threshold level 54 for signal C is approximately 2.4 volts and the threshold level 56 for signal D is approximately 1.2 volts. The illustrated threshold level values for voltages are for the preferred embodiment and are illustrated to emphasize the electrical incompatibility between the pairs of restraint signals. Thus, a circuit arranged to recognize the threshold levels 50 and 52 for signals A and B would improperly identify the active and inactive states of signals C or D, and vice versa.

Referring to FIG. 3, input circuits 12 comprise four individual input circuits 12A through 12D and a voltage divider circuit 12VD. The downstream restraint signals presented by the downstream devices are voltage levels directed into particular input load impedances. The input circuit for each downstream restraint signal provides the minimum load impedance to each downstream circuit breaker to insure proper restraint signal operation while preventing overloaded downstream restraint signal outputs. The input circuits can be thought of as being means for indicating when the received downstream restraint signals are active to indicate the information carried therein.

Input circuit 12A comprises terminal DN-A presenting the received downstream restraint signal A on lead 60 to the plus input of comparator $U_{IA}$. Input diodes D1 and D2 respectively clamp the received restraint signal between plus 12 volts and ground while resistor R1 connected from lead 60 to ground provides the desired input impedance. The negative input of comparator $U_{IA}$ is connected by lead 62 to between resistors R7 and R8 of voltage divider 12VD.

Input circuit 12B comprises lead 64 carrying downstream restraint signal B from terminal DN-B to the positive input of comparator $U_{IB}$. Input diodes D3 and D4 respectively clamp the received restraint signal B between plus 12 volts and ground. Resistor R2 provides the necessary input impedance from lead 64 to ground. A negative input of comparator $U_{IB}$ is connected to voltage divider 12VD through lead 62.

Input circuit 12C comprises lead 66 carrying the downstream restraint signal C from terminal DN-C to the positive input of comparator $U_{IC}$. Diodes D6 and D7 clamp the received downstream restraint signal C between plus 12 volts and ground. Resistor R4, connected to lead 66 provides the necessary impedance for the downstream restraint signal C to ground. A negative input of comparator $U_{IC}$ is connected to voltage divider 12VD through lead 62.

Associated with input circuit 12C is test switch circuit 18. Circuit 18 comprises a serial connection of resistor R3 and switch 68 between lead 66 and plus 12 volts. Circuit 18 also comprises blocking diode D5 which prevents the test voltage provided by switch 68 from being reflected into other downstream restraint signals. In operation, closing the contact of switch 68 causes a voltage on lead 66 that imitates the active state of a received downstream restraint signal C. The effect of receipt of such an active state will be discussed hereinafter.

Input circuit 12D comprises a voltage divider formed by the serial connection of resistors R5 and R6 from input terminal DN-D to ground, the intermediate connection between resistors R5 and R6 being carried on lead 70 to the positive input of comparator $U_{ID}$. Diodes D8 and D9 clamp the received downstream restraint signal between plus 12 volts and ground. A negative input of comparator $U_{ID}$ is connected by lead 72 between resistors R8 and R9 of voltage divider 12.

Voltage divider 12VD comprises resistors R7, R8 and R9 serially connected between plus 12 volts and ground.

The outputs of comparators $U_{IA}$ through $U_{ID}$ have common electrical characteristics determined by the type of integrated circuits providing the comparator functions. Preferably, the outputs in each of the comparators will be at logic levels for use in the logic circuits 14. The output of each comparator indicates with an active HIGH or an inactive LOW the active and inactive information state of its corresponding or associated downstream restraint signal.

The output of comparator $U_{IA}$ is downstream logic signal A appearing on lead 74. Lead 74 is tied to plus 12 volts by resistor R10 to provide sufficient drive for logic circuits 14. The output of comparator $U_{IB}$ is downstream logic signal B appearing on lead 76. Lead 76 is tied to plus 12 volts through resistor R11 to provide sufficient drive for logic circuits 14. The output of comparator $U_{IC}$ is downstream logic signal C appearing on lead 78. Lead 78 is tied to plus 12 volts through resistor R12 to provide sufficient drive for logic circuits 14. The output of comparator $U_{ID}$ is downstream logic signal D appearing on lead 80. Lead 80 is tied to plus 12 volts through resistor R13 to provide sufficient drive for logic circuits 14.

Logic circuits 14 comprise four logic circuits 14A through 14D that function to distribute the intelligence or information from the downstream restraint signals to the selected, appropriate output circuits producing the upstream restraint signals. The downstream logic signals indicate the active or inactive information state of the downstream restraint signals and the downstream logic signals are connected to certain inputs of the logic circuits for proper distribution of the ground fault and short-time information represented thereby. The logic circuits can be thought of as means for selecting between the ground fault and short-time information.

The individual logic circuits 14A through 14D respectively receive downstream logic signals A through D on leads 74 through 80. Logic circuit 14A comprises logical NOR gate $U_{LA}$ having an output connected in series with inverters 82 and 84. NOR gate $U_{LA}$ has four inputs that are connected respectively to lead 74, ground, lead 78, and lead 80. Logic circuit 14B comprises NOR gate $U_{LB}$ having an output connected in series with inverters 86 and 88. NOR gate $U_{LB}$ has four inputs that are connected respectively to ground, lead 76, lead 78 and ground. Logic circuit 14C comprises NOR gate $U_{LC}$ having an output connected in series with inverter 90. NOR gate $U_{LC}$ has four inputs that are connected respectively to lead 74, lead 76, lead 78, and lead 80. Logic circuit 14D comprises NOR gate $U_{LD}$ having an output connected in series with inverter 92. NOR gate $U_{LD}$ has four inputs that are connected to leads 74, 78, and 80 and ground.

The outputs of logic circuits 14A through 14D, being respectively the outputs of inverters 84, 88, 90 and 92, are upstream logic signals A, B, C and D. Upstream logic signals A through D are at the same common logic electrical parameters as the downstream logic signals. The information indicated by each upstream logic signal is the same as the information carried by the similarly lettered downstream restraint signal and downstream logic signal.

Additionally, the upstream logic signals indicate the active information state of every downstream logic signal, and thereby the downstream restraint signal, to which the inputs of its corresponding logic gate are connected. Thus, an upstream logic signal can be in an active state even though its corresponding downstream logic signal is in an inactive state. This occurs because any one input to its corresponding NOR gate being in an active state produces an active state in that upstream logic signal.

For example, the upstream logic signal A on lead 94 will be active whenever an active state occurs in downstream logic signal A on lead 74, in downstream logic signal C on lead 78 or in downstream logic signal D on lead 80. Otherwise upstream logic signal A on lead 94 will be in an inactive state. Upstream logic signal B on lead 96 will be in an active state whenever an active state appears in downstream logic signal B on lead 76 or downstream logic signal C on lead 78. Otherwise upstream logic signal B will be in an inactive state.

Upstream logic signal C will be in an active state whenever an active state occurs in any one of downstream logic signals A, B, C and D on leads 74 through 80. Otherwise upstream logic signal C on lead 98 will be in an inactive state. Downstream logic signal D on lead 100 will be in an active state whenever an active state occurs in any one of downstream logic signal A on lead 74, downstream logic signal C on lead 78, and downstream logic signal D on lead 80. Otherwise upstream logic signal D on lead 100 will be in an inactive state.

Logic circuits 14 thus distribute information from any one downstream logic signal to all of the selected upstream logic signals representing the same information. Distribution of information to the upstream logic signals is to only those upstream logic signals carrying the same type of information, i.e. ground fault information is not distributed to leads indicating only short-time information.

Output circuits 16 comprise four output circuits 16A, 16B, 16C and 16D respectively related to each of the upstream logic signals A through D and producing each of the upstream restraint signals A through D. Output circuit 16A comprises transistor $Q_A$ having its emitter connected to ground, its collector connected to plus 12 volts through series resistor R18 and its base connected to the upstream logic signal A on lead 94 through series resistor R14. The collector of transistor $Q_A$ also is connected to terminal UP-A by lead 102 through a series forward biased blocking diode D10. A produced upstream logic signal A appears on lead 102 and at terminal UP-A.

The active state of upstream logic signal A on lead 94, which is a logical LOW draws base bias current from transistor $Q_A$, which turns off, allowing lead 102 to be pulled to the plus 12 volts supply through resistor R18, effecting the active state of upstream restraint signal A. Normally upstream logic signal A on lead 94 is at a logical HIGH which provides base bias current to transistor $Q_A$, keeping transistor $Q_A$ on and pulling the upstream restraint signal A on lead 102 close to ground through the collector and emitter of transistor $Q_A$. This is the inactive state.

Output circuit 16B comprises transistor $Q_B$ having its emitter connected to ground, its collector connected to plus 12 volts through series resistor R19 and its base connected to upstream logic signal B on lead 96 through series resistor R15. The collector of transistor $Q_B$ also is connected to terminal UP-B by lead 104 through series connected forward biased blocking diode D11. A produced upstream restraint signal B appears on lead 104 and terminal UP-B.

The active state of upstream logic signal B on lead 96, which is a logical LOW, draws base bias current from transistor $Q_B$, turning it off. This draws upstream restraint signal on lead 104 to plus 12 volts through resistor R19 to indicate its active state. An inactive state in upstream logic signal B on lead 96, which is a logical HIGH, provides base bias current through resistor R15 to transistor $Q_B$ turning it on. This pulls the upstream restraint signal B on lead 104 to a voltage just above ground through the collector and emitter of transistor $Q_B$, indicating the inactive state.

Output circuit 16C comprises transistor $Q_C$ having its collector connected directly to plus 12 volts, and its emitter connected to output terminal UP-C through lead 106 and series connected resistor R20 and forward bias blocking diode D12. Zener diode Z1 is connected between lead 106 and ground to set the voltage appearing on lead 106 and terminal UP-C as upstream restraint signal C. The base of transistor $Q_C$ is connected to upstream logic signal C on lead 98 through series resistor R16.

The active state of upstream logic signal C on lead 98 is a logical HIGH which provides base bias current to transistor $Q_C$ through resistor R16 turning transistor $Q_C$ on. This allows current to flow from the plus 12 volts supply through the collector and emitter of transistor $Q_C$ and through resistor R20 and forward biased diode D12 to terminal UP-C to form the upstream restraint signal C in the active state, the voltage of this signal being determined by zener diode Z1. The inactive state of upstream logic signal C on lead 98, which is a logic LOW, draws base bias current from transistor $Q_C$ through resistor R16 turning transistor $Q_C$ off. Upstream restraint signal C in the inactive state is clamped just above ground by zener diode Z1 and blocking diode D12.

Output circuit 16D comprises transistor $Q_D$ having its collector connected to the plus 12 volts supply, and its emitter connected to terminal UP-D through series connected resistor R21, lead 108 and forward biased blocking diode D13. The base of transistor $Q_D$ is connected to upstream logic signal D on lead 100 through series resistor R17. A produced upstream logic signal D appears on lead 108 and terminal UP-D.

An active state in upstream logic signal D on lead 100, which is a logical HIGH, provides base bias current to transistor $Q_D$ turning transistor $Q_D$ on. This enables current to flow from the 12 volts supply through the collector and emitter of transistor $Q_D$, through resistor R21, lead 108 and forward biased blocking diode D13 to terminal UP-D to form the active state of upstream restraint signal D. The inactive state of upstream logic signal D on lead 100, which is a logical LOW, pulls base bias current from transistor $Q_D$ turning it off. Upstream restraint signal D at terminal UP-D then is clamped to just above ground through diode D13, lead 108, and clamping diode D16, which is part of the monitor circuit 20 to be discussed. This effects the inactive state of upstream restraint signal D.

The output circuits thus transform the common electrical characteristics or parameters of the upstream logic signals to the desired electrical parameters of the upstream restraint signals while maintaining the information content indicated by the active and inactive state of those upstream logic signals. From another point of view, the output circuits are means for combining the electrical parameters and the selected information to be carried to produce each upstream restraint signal.

Blocking diodes D10, D11, D12 and D13 prevent any additional upstream restraint signals connected to the output terminals UP-A through UP-D from interfering with the output circuits 16A through 16D.

Monitor circuit 20 comprises four comparators $U_{OA}$ through $U_{OD}$ driving four light emitting diodes (LEDs) 110 through 116 that when lit and extinguished indicate the active and inactive states of the respective upstream restraint signals A through D. The positive inputs of comparators $U_{OA}$ and $U_{OB}$ are connected by way of lead 118 between the series connection of resistors R26 and R27 connected between plus 12 volts and ground to form a voltage divider. The voltage on lead 118 sets the level at which comparators $U_{OA}$ and $U_{OB}$ will switch their outputs in response to the signals applied to their negative inputs.

The negative input of comparator $U_{OA}$ is connected to the upstream restraint signal A on lead 102 and to a minimum load resistor R22 and a clamping diode D14, both also connected to ground. The output of comparator $U_{OA}$ is connected in series to load resistor R31, light LED 110 and $V_{LED}$ supply voltage. When the upstream restraint signal A on lead 102 goes to an active state it attains a voltage higher than the voltage on lead 118 causing comparator $U_{OA}$ to drive its output LOW. This provides a current path from supply $V_{LED}$ through LED 110 and resistor R31 to ground, lighting the LED 110 to indicate an active state. When the upstream restraint signal A on lead 102 is a logical LOW, its voltage is less than that on lead 118 causing comparator $U_{OA}$ to drive its output HIGH so that no current flows through LED 110, keeping it extinguished to indicate the inactive state of the upstream restraint signal A.

The negative input of comparator $U_{OB}$ is connected to the upstream restraint signal B appearing on lead 104 and to minimum load resistor R23 and clamping diode D15, both of which are also connected to ground. The output of comparator $U_{OB}$ is connected in series to load resistor R32, LED 112 and supply $V_{LED}$. In a manner similar to that of upstream restraint signal A, the active and inactive states on upstream restraint signal B cause the LED 112 to light and be extinguished, respectively.

The positive input of comparator $U_{OC}$ is connected by way of lead 120 to between the series connection of resistors R28 and R29 in a voltage divider formed by the series connection of resistors R28, R29, and R30 between plus 12 volts and ground. The voltage at the positive input of comparator $U_{OC}$ determines the level at which its output will switch from a HIGH to a LOW dependent upon the voltage applied to the negative input of comparator $U_{OC}$. The negative input of comparator $U_{OC}$ is connected to the upstream restraint signal C on lead 106 and to minimum load resistor R24 which also is connected to ground. The output of comparator $U_{OC}$ is connected in series to load resistor R33, LED 114 and supply $V_{LED}$. The active HIGH state of upstream restraint signal C on lead 106 causes the output of comparator $U_{OC}$ to go LOW enabling current to flow through and lighting LED 114. The inactive LOW state of upstream restraint signal C on lead 106 causes the output of comparator $U_{OC}$ to go HIGH extinguishing the light from LED 114.

The positive input of comparator $U_{OD}$ is connected between resistors R29 and R30 of the previously described voltage divider. The voltage at the positive input of comparator $U_{OD}$ determines the level at which the output of that comparator will switch from HIGH to LOW relative to the voltage applied to its negative input. A negative input of comparator $U_{OD}$ is connected to upstream restraint signal D on lead 108 and minimum load resistor R25 and clamping diode D16, which both are also connected to ground. The output of comparator $U_{OD}$ is connected in series to resistor R34, LED 116 and source $V_{LED}$. In a manner similar to that of upstream restraint signal C, the active and inactive states of upstream restraint signal D respectively light and extinguish LED 116.

The restraint signal interface circuit 10 thus provides that an active state in downstream restraint signal A, indicating ground fault information, effects an active state in upstream restraint signal A and in upstream restraint signals C and D, which also carry like ground fault information, but not in upstream restraint signal B, which carries only short-time information. For like reasons an active state in downstream restraint signal B effects an active state in only upstream restraint signals B and C to indicate short-time information. An active state in downstream restraint signal C effects an active state in all four upstream restraint signals A-D to indicate both ground fault and short-time information. An active state in downstream logic signal D effects an active state in only upstream restraint signals A, C and D to indicate ground fault information.

Testing the operation of the circuit 10 involves simply operating switch 68. This imitates an active state on downstream restraint signal C and lights all four LEDS 110-116 to indicate proper production of the upstream restraint signals A-D.

The values for the components used in the preferred embodiment of the invention described herein are described in the following list:

| | |
|---|---|
| R1, R2 - 1 mohm | D1-D16 - 1N4148 |
| R3, R4 - 47 kohm | Z1 - 1N5232B, 5.5 volts |
| R5, R6 - 1 kohm | $U_{IA}$-$U_{ID}$ - LM139J |
| R7 - 82 kohm | $U_{OA}$-$U_{OD}$ - LM139J |
| R8 - 10 kohm | $U_{LA}$-$U_{LD}$ - CD4002CJ |
| R9 - 4.7 kohm | Inverters 82-92 - |
| R10, R11, | CD4049CJ |
| R12, R13 - 100 kohm | QA, QB QC - 2N2222A |
| R14, R15 - 22 kohm | QD - 2N6288 |
| R16, R17, | |
| R18, R19 - 2.7 kohm | |
| R20 - 1 kohm | |
| R21 - 47 kohm | |
| R22, R23, | |
| R24 - 1 mohm | |
| R25 - 10 kohm | |
| R26 - 27 kohm | |
| R27, R28 - 68 kohm | |
| R29, R30 - 22 kohm | |
| R31, R32, | |
| R33, R34 - 2.7 kohm | |

The specific details described in conjunction with the preferred embodiment can be varied while remaining within the scope of the invention. For example, the exact values of the components disclosed herein can be varied to accommodate downstream and upstream restraint signals of different electrical parameters. The number of downstream and upstream restraint signals can be varied while varying the logic circuits to provide for the proper distribution of ground fault and short-time restraint information to the proper output signal. Additional data can also be incorporated into the system if desired and different circuit breakers can be used.

The restraint signal interface circuit of the invention thus provides an interface means receiving electrical signals at different electrical parameters and indicating different information to produce electrical signals having correspondingly different electrical parameters and of corresponding information content with a distribution of information from any one received electrical signal to selected produced electrical signals, the distribution being to all or less than all of said produced electrical signals.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

We claim:

1. In an alternating current electrical distribution system utilizing a plurality of protective circuit breakers spaced along the stream of the distribution system from a source of supply to a plurality of separate loads, a restraint signal interface circuit for selectively providing upstream restraint signals for circuit breakers upstream thereof dependent on the state of downstream restraint signals, said interface circuit comprising:
   (a) means for pairing a produced upstream restraint signal with each received downstream restraint signal, each pair of restraint signals having the same electrical parameters and carrying the same type of at least one of ground fault and short-time information; said means for pairing comprising:
   (b) means for indicating when said received downstream restraint signals are active to indicate said information;
   (c) means for selecting between said received at least ground fault and short-time information; and
   (d) means for combining said electrical parameters and selected information to be carried to produce said upstream restraint signals.

2. The interface circuit of claim 1 in which said means for selecting include gating means for effecting an active state in all of the upstream restraint signals carrying the same type of information that is carried by any one downstream restraint signal in an active state.

3. The interface circuit of claim 2 in which said gating means effect an active state in less than all of said upstream restraint signals.

4. The interface circuit of claim 2 in which said gating means include a logic gate for each pair of restraint signals, the logic gate having an output from which each said upstream restraint signal is produced and having a plurality of inputs, each downstream restraint signal being coupled to a selected input of a logic gate, so that an indicated active state in any one downstream restraint signal effects an active state in all selected upstream restraint signals.

5. The interface circuit of claim 1 in which said different pairs of restraint signals have different electrical parameters and carry different information, said means for indicating include an input circuit means for each received downstream restraint signal responsive to the individual electrical parameters thereof, and said means for combining include an output circuit means for each produced upstream restraint signal productive of the electrical parameters thereof.

6. In an alternating current electrical distribution system utilizing a plurality of protective circuit breakers spaced along the stream of the distribution system from a source of supply to a plurality of loads, a restraint signal interface circuit for selectively providing upstream restraint signals for circuit breakers upstream thereof dependent on the state of downstream circuit breakers indicated by downstream restraint signals, said interface circuit comprising:
   (a) means for pairing each produced upstream restraint signal with each received downstream signal, each pair of restraint signals carrying the same type of at least one of ground fault type and short-time type information; said means for pairing comprising:
   (b) means for indicating the active information state of each of said received downstream restraint signals; and
   (c) logic means for effecting an active state in the upstream restraint signals carrying the same type of information that is carried by any one downstream restraint signal indicated to be in an active state.

7. The interface circuit of claim 6 in which said active state is effected in less than all of the upstream restraint signals.

8. The interface circuit of claim 6 in which said logic means produce an upstream logic signal, having an active and inactive state, for each upstream restraint signal to be produced and in which each upstream restraint signal correlates to predetermined electrical parameters, said interface circuit including means for combining said electrical parameters with said states to produce said respective upstream restraint signals.

9. The interface circuit of claim 8 in which said logic means include a logical gate producing each upstream logical signal, each logical gate having a plurality of inputs with each downstream restraint signal being coupled to selected inputs of said logical gates.

10. A restraint signal interface circuit for use in an alternating current electrical distribution system having a plurality of protective circuit breakers spaced upstream and downstream of one another along the stream of the distribution system from a source of supply to a plurality of separate loads, said circuit comprising:
   (a) a plurality of input terminals, each adapted to receive a downstream restraint signal indicating either the active or inactive information state of at least one downstream circuit breaker, each downstream restraint signal being defined by electrical parameters of voltage and current and carrying information of at least one of a ground fault type and short-time type, the downstream restraint signal received at each terminal being incompatible with the signals received at every other terminal;
   (b) a plurality of input circuits, each including a comparator having one input lead connected to a reference and another input lead connected to one of said input terminals, said comparator having an output lead and said reference being set relative to the parameters of the downstream restraint signal received on said one terminal so that active and inactive information states of the downstream restraint signal produce respective active and inactive information states on said output lead;
   (c) a plurality of output terminals that are each paired with one input terminal, each said output terminal adapted to be connected to at least one upstream circuit breaker to convey thereto an upstream restraint signal for effecting an ordered operation of upstream and downstream circuit breakers,
   (d) a plurality of logical gates, one for each output terminal, each logical gate having an output lead and a plurality of input leads with the output of each comparator being connected to an input of at least one selected logical gate, said logical gate producing an active state on said output lead in response to an active state on any one of said input leads, said output lead otherwise being in an inactive state; and (e) a plurality of output circuits, each including a transistor having one lead connected to one output terminal and another lead connected to the output lead of one logical gate that is coupled to the paired input terminal of that output terminal, said transistor producing at said one output terminal an upstream restraint signal having the same parameters and carrying the same information as said downstream restraint signal adapted to be received at said paired input terminal.

11. The interface circuit of claim 10 in which the output leads of said comparators indicating the active and inactive information states of the same type of information are connected to the inputs of the same logical gates.

12. The interface circuit of claim 11 in which the inputs of said logical gates are connected to the output leads of said comparators so that an active state in any one downstream restraint signal adapted to be received results in active states in less than all the upstream restraint signals produced at said output terminals.

13. The interface circuit of claim 10 including means for visually indicating, for each of the upstream restraint signals, the active and inactive states respectively by lighting and extinguishing a light emitting diode.

* * * * *